Patented Oct. 11, 1932

1,881,691

UNITED STATES PATENT OFFICE

CARL KRAUCH, OF LUDWIGSHAFEN-ON-THE-RHINE, MATHIAS PIER, OF HEIDELBERG, AND ERNST HOCHSCHWENDER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SEPARATION OF OILS FROM MIXTURES THEREOF WITH SOLID SUBSTANCES

No Drawing. Application filed March 22, 1928, Serial No. 263,957, and in Germany March 26, 1927.

This invention relates to improvements in the separation of oils from mixtures thereof with solid substances.

In many industrial processes, in which distillible carbonaceous materials are subjected to a conversion by heat treatment, and more especially in the low temperature carbonization, cracking and treatment by extraction of carbonaceous materials, and in the destructive hydrogenation of coals, tars, mineral oils and the like, varying quantities of usually semi-solid, pasty or pitch-like products are obtained, inter alia, which consist of mixtures of oils with solid substances such as carbonaceous residues, ash constituents, or other solid impurities such as catalysts and in these cases it is often difficult to separate the oil from the solid substances.

We have now found that the oils may be successfully separated from the mixtures thereof with solid substances obtained in the said industrial processes by stirring the mixture, preferably at a slightly elevated temperature, with a liquid in which the oil is insoluble, or only slightly soluble, and the surface tension of which is such that the stirring loosens the adhesion between the solid substances (which means substances remaining solid during the treatment) and the oil retained therein, the separation being then effected in any convenient way.

The liquid selected according to this invention for addition is preferably of a specific gravity intermediate between the densities of the substances which it is desired to separate. In some cases, water for example may be successfully used. The added liquid may be such as is sufficiently effective itself, or its surface tension may be modified as desired by suitable additions, the nature of which will depend on the nature of the oil and the added liquid. For example, it has been found advantageous to use water with additions of nucleo-alkylated sulfonic acids of aromatic hydrocarbons, cellulose pitch, saturated or unsaturated fatty acids, their salts and derivatives and the like. The said nucleo-alkylated sulfonic acids of aromatic hydrocarbons and their salts are hereinafter referred to as "compounds supplying nucleo-alkylated aromatic sulfonate anions when added to water" since this effect is common both to the said acids and their salts. Particular classes of these compounds are referred to in an analogous manner. Products obtained by sulfonating products of the destructive hydrogenation of coal, tars and the like are also suitable.

When the adhesion between the solid substances and the oil has been sufficiently loosened, the oil is separated in various ways, as for example mechanically, as by centrifugal means, preferably in the warm, or by means of electric or magnetic fields, or in other suitable ways, or by the application of several methods of separation simultaneously.

The process may be applied by itself or in combination with other methods, such as subsequent low-temperature carbonization, or extraction and the like; and the mixtures may also be subjected to repeated treatment and to the action of different kinds of liquids. The conditions in respect of pressure and temperature may be varied within wide limits according to the character of the substances under treatment.

The operation is rendered particularly advantageous in case the solution containing the additions is used over again for new operations which may be done without any troublesome process of purification.

The following examples will further illustrate the nature of the said invention which, however, is not limited thereto.

Example 1

The residue obtained from the destructive hydrogenation of brown coal and substantially freed from low-boiling constituents, such as benzines and intermediate oils, is stirred, at about 80° centigrade, with water containing an addition of a little sodium isopropylnaphthalenesulfonate. When the mass has attained the consistency of a paste, it is centrifuged at about 90° centigrade whereby it separates into three layers. The solid substances pass through the aqueous layer and are deposited on the walls of the centrifugal machine, whilst, by reason of its greater density, the water displaces the oil towards the centre of the apparatus. The removal of the final traces of oil retained by the capillary attraction of the solids is facilitated by the capillary activity of the added salt. The oil is separated from the aqueous layer in suitable vessels and is practically free from solid substances. The solids deposited on the walls still contain small quantities of oil, which can be removed, for example, by distillation or carbonization with hot gases or by steam, or by extraction or other methods.

*Example 2*

1 part of a paste of coaly matter, such for example as is obtained by the destructive hydrogenation of coal, comprising a mixture of 2 parts of coal and 3 parts of heavy oil is stirred at about 80° C. with 2 parts of a 2 per cent aqueous solution of cellulose pitch and the mixture centrifuged at about 90° C. The mixture separates into 3 layers, namely an aqueous layer, an oily layer and a layer consisting of solid residues. These may be easily separated whereby the greater part of the oil is recovered. The solid residue is washed with the aqueous liquid for so long, with the aid of centrifuging, until no more oil separates out into the aqueous layer. If catalysts or dispersing agents are employed in the destructive pressure hydrogenation of substances of the nature of coal, tar, mineral oils and the like, these may also be easily separated from the recovered oils in the manner above described.

What we claim is:—

1. The process for the separation of oil from the residues from the destructive hydrogenation of coal which comprises stirring the mixture with water with an addition of a nuclear alkylated naphthalene sulphonate and centrifuging.

2. A process for the separation of oils from solid to pasty mixtures thereof with solid substances, which remain solid during the treatment and which are derived from industrial processes, in which distillable carbonaceous materials are subjected to a conversion by heat treatment, which comprises treating the mixture with water with an addition of a compound supplying nucleo-alkylated aromatic sulfonate anions when added to water, and then separating the liquids from the solids.

3. A process for the separation of oils from solid to pasty mixtures thereof with solid substances, which remain solid during the treatment and which are derived from industrial processes, in which distillable carbonaceous materials are subjected to a conversion by heat treatment, which comprises treating the mixture with water with an addition of a compound supplying an isopropyl naphthalene sulphonate anion when added to water, and then separating the liquids from the solids.

In testimony whereof we have hereunto set our hands.

CARL KRAUCH.
MATHIAS PIER.
ERNST HOCHSCHWENDER.